United States Patent
Beauchamp

(10) Patent No.: US 10,111,417 B2
(45) Date of Patent: Oct. 30, 2018

(54) WATERFOWL DECOY DEPLOYMENT SYSTEMS

(71) Applicant: QUICKCOYS OUTDOOR PRODUCTS LLC, Macon, MO (US)

(72) Inventor: Keith Beauchamp, Macon Lake, MO (US)

(73) Assignee: QUICKCOYS OUTDOOR PRODUCTS LLC, Macon, MO (US)

(*) Notice: Subject to any disclaimer, the term of this patent is extended or adjusted under 35 U.S.C. 154(b) by 24 days.

(21) Appl. No.: 15/216,927

(22) Filed: Jul. 22, 2016

(65) Prior Publication Data

US 2016/0324143 A1 Nov. 10, 2016

Related U.S. Application Data

(63) Continuation-in-part of application No. 14/626,258, filed on Feb. 19, 2015, now Pat. No. 9,999,215.

(51) Int. Cl.
*A01M 31/06* (2006.01)

(52) U.S. Cl.
CPC .................. *A01M 31/06* (2013.01)

(58) Field of Classification Search
CPC ................................. A01M 31/06
USPC .......................................... 43/3, 2
See application file for complete search history.

(56) References Cited

U.S. PATENT DOCUMENTS

| | | | |
|---|---|---|---|
| 694,732 A | 3/1902 | Coudon | |
| 970,003 A | 9/1910 | Wethall | |
| 1,746,640 A | 2/1930 | Emoff | |
| 2,547,286 A * | 4/1951 | Sabin | A01M 31/06 43/3 |
| 2,624,144 A | 1/1953 | Beverman | |
| 3,950,883 A * | 4/1976 | Shepherd | A01K 87/08 43/22 |
| 4,141,167 A | 2/1979 | Muehl | |
| 4,660,313 A | 4/1987 | Bauemfeind et al. | |
| 6,574,902 B1 * | 6/2003 | Conger | A01M 31/06 43/2 |
| 6,655,071 B2 | 12/2003 | Barnes et al. | |
| 6,957,509 B2 | 10/2005 | Wright | |
| 7,347,024 B1 | 3/2008 | Vest | |
| 8,256,155 B1 * | 9/2012 | Goodwill | A01M 31/06 43/3 |
| 8,887,433 B2 | 11/2014 | Luttrull | |
| 2012/0240447 A1 * | 9/2012 | Gurner, III | A01M 31/06 43/2 |
| 2013/0014422 A1 | 1/2013 | Bullerdick et al. | |

(Continued)

*Primary Examiner* — Jessica B Wong

(74) *Attorney, Agent, or Firm* — Armstrong Teasdale LLP

(57) ABSTRACT

A waterfowl decoy deployment system includes a hub subsystem. The hub subsystem includes a casing defining a plurality of apertures therein. The hub subsystem also includes a plurality of arm suspension mechanisms. Each aperture of is configured to receive one arm suspension mechanism. Each arm suspension mechanism includes a biasing device inserted into one aperture, a collet coupled to the biasing device, and a collet nut coupled to the collet. The hub subsystem also includes a plurality of arms extending radially outward from the casing. Each arm is coupled to one arm suspension mechanism. The waterfowl decoy deployment system also includes a plurality of waterfowl decoys. At least one waterfowl decoy is coupled to each arm.

9 Claims, 15 Drawing Sheets

(56) References Cited

U.S. PATENT DOCUMENTS

2013/0212924 A1\* 8/2013 Shisko .................. A01M 31/06
                                                                          43/2
2016/0242409 A1\* 8/2016 Beauchamp .......... A01M 31/06

\* cited by examiner

WATERFOWL DECOY DEPLOYMENT SYSTEMS

CROSS REFERENCE TO RELATED APPLICATIONS

This application is a continuation-in-part of U.S. patent application Ser. No. 14/626,258, filed Feb. 19, 2015, the contents of which are hereby incorporated by reference in their entirety.

BACKGROUND

The present disclosure relates generally to hunting decoys, and more particularly to waterfowl, e.g., duck decoy deployment systems.

Most known waterfowl decoy deployment systems are used by hunters to attract waterfowl, such as ducks, so that wild waterfowl are attracted to the decoys and will be brought into shooting range. Many of these known waterfowl decoy deployment systems use submerged components that are spreadable when deploying and collapsible when retrieving. Such known deployment systems typically include a plurality of decoys tethered in some manner to one or more extendable and retractable arms. Many of these known deployment systems experience similar problems. One such problem is that the systems are difficult to deploy and retract since they require some sort of mechanical operation by the hunter. Use of a large numbers of decoys is desirable in order to better attract waterfowl. However, the time and effort needed to deploy and retract decoys becomes more difficult as the number of decoys increases. In addition, storing, deploying, and recovering a large number of decoys on a single system further increase in difficulty because of the tendency of the tethering lines and the decoys to become entangled with each other. Some known waterfowl decoy deployment systems alleviate entanglement of the tethering lines; however, such known systems rely on arms at different heights, i.e., height indexing with respect to a center hub to accommodate a substantial amount of hardware within the hub. Moreover, since most waterfowl hunting seasons are in autumn and winter, increasing the amount of time spending deploying and retracting decoys adds another layer of difficulty to a recreational venture.

BRIEF DESCRIPTION

In one aspect, a waterfowl decoy deployment system is provided. The waterfowl decoy deployment system includes a hub subsystem that includes a casing defining a plurality of apertures therein. The hub subsystem also includes a plurality of arm suspension mechanisms. Each aperture of the plurality of apertures is configured to receive one arm suspension mechanism of the plurality of arm suspension mechanisms. Each arm suspension mechanism of the plurality of arm suspension mechanisms includes a biasing device inserted into one aperture of the plurality of apertures, a collet coupled to the biasing device, and a collet nut coupled to the collet. The hub subsystem further includes a plurality of arms extending radially outward from the casing. Each arm of the plurality of arms is coupled to one arm suspension mechanism of the plurality of arm suspension mechanisms. The waterfowl decoy deployment system also includes a plurality of waterfowl decoys. At least one waterfowl decoy of the plurality of waterfowl decoys is coupled to each arm.

In another aspect, a waterfowl decoy deployment system is provided. The waterfowl decoy deployment system includes a hub subsystem including a casing. The waterfowl decoy deployment system also includes a hub cap coupled to the casing and a plurality of arms extending radially outward from the casing. Each arm of the plurality of arms defines a perimeter. The waterfowl decoy deployment system further includes a plurality of waterfowl decoys. At least one waterfowl decoy of the plurality of waterfowl decoys is coupled to each arm of the plurality of arms. The waterfowl decoy deployment system also includes a plurality of decoy tethers coupled to the plurality of waterfowl decoys. At least one waterfowl decoy of the plurality of waterfowl decoys is coupled to a respective decoy tether of the plurality of decoy tethers. The waterfowl decoy deployment system further includes a decoy tether guide subsystem including the hub cap that defines a plurality of decoy tether guides therein and a plurality of decoy tether guide devices coupled to each arm of the plurality of arms. Each respective decoy tether guide device of the plurality of decoy tether guide devices is configured to receive a respective decoy tether of the plurality of decoy tethers. At least a portion of the plurality of decoy tether guide devices is positioned such that they are indexed with respect to the perimeter of each arm of the plurality of arms.

DRAWINGS

FIG. 1 is a schematic perspective view of a portion an exemplary waterfowl decoy deployment system;

FIG. 2 is a schematic perspective partially exploded view of a portion of the waterfowl decoy deployment system shown in FIG. 1;

FIG. 3 is a schematic cutaway side view of a portion of the waterfowl decoy deployment system shown in FIGS. 1 and 2 including a hub subsystem;

FIG. 4 is a schematic perspective top view of an exemplary casing that may be used with the hub subsystem shown in FIG. 3;

FIG. 5 is a schematic side view of an exemplary handle device and an exemplary hub cap that may be used with the waterfowl decoy deployment system shown in FIGS. 1 and 2;

FIG. 6 is a schematic cutaway perspective view of the handle device shown in FIG. 6;

FIG. 7 is a schematic perspective view of an exemplary arm suspension mechanism, i.e., a spring adaptor assembly that may be used with the hub subsystem shown in FIG. 3;

FIG. 8 is a schematic exploded view of the spring adaptor assembly shown in FIG. 4;

FIG. 9 is a schematic perspective bottom view of a portion of the waterfowl decoy deployment system shown in FIGS. 1 and 2;

FIG. 10 is a schematic side view of an exemplary anchor plate that may be used with the waterfowl decoy deployment system shown in FIGS. 1 and 2;

FIG. 11 is a schematic overhead view of the hub cap shown in FIG. 5 and a portion of an exemplary decoy tether guide subsystem;

FIG. 12 is a schematic perspective overhead view of the hub cap shown in FIGS. 5 and 11;

FIG. 13 is a schematic side view of the hub cap shown in FIGS. 5, 11, and 12;

FIG. 14 is a schematic bottom view of the hub cap shown in FIGS. 5, 11, 12, and 13;

FIG. 15 is a schematic overhead view of a deployably extendable and flexibly collapsible arm and another portion of the exemplary decoy tether guide subsystem that may be used with the waterfowl decoy deployment system shown in FIGS. 1 and 2;

FIG. 16 is a schematic perspective view of a portion of the deployably extendable and flexibly collapsible arm shown in FIG. 15;

FIG. 17 is a schematic longitudinal view of a portion of the deployably extendable and flexibly collapsible arm shown in FIG. 15;

FIG. 18 is a schematic overhead view of the portion of the deployably extendable and flexibly collapsible arm shown in FIG. 15;

FIG. 19 is a schematic perspective view of another portion of the deployably extendable and flexibly collapsible arm; and FIG. 20 is another schematic perspective view of the portion of the deployably extendable and flexibly collapsible arm shown in FIG. 19.

DETAILED DESCRIPTION

The exemplary apparatus and systems described herein overcome at least some disadvantages of known waterfowl decoy deployment systems by providing a hub subsystem and a decoy tether guide subsystem to simplify deployment and retrieval of a large number of duck decoys while mitigating entanglement of the decoys and their tethers. Specifically, a hub cap on the top of the center casing of the hub subsystem uses a portion of the decoy tether guide subsystem to route the plurality of tethers from the hub cap to a plurality of deployably extendable and flexibly collapsible arms, where another portion of the decoy tether guide subsystem routes the individual tethers to the respective decoys. In addition, a unique spring-collet-collet nut assembly forms a biased arm suspension mechanism for each arm, where the biased arm suspension mechanisms facilitate arranging the configuration of the arms and tethers to not require any height indexing thereof to reduce a potential for tether entanglement. As such, the decoy tether guide subsystem described herein facilitates quick, independent, and automatic operation of a plurality of deployably extendable and flexibly collapsible arms extending therefrom. Additionally, the decoy tether guide subsystem facilitates mitigating a potential for entanglement of the decoys and their respective tethers. Furthermore, the waterfowl decoy deployment systems described herein a unique slot system for coupling devices, such as motive devices, to the waterfowl decoy deployment system, thereby facilitating substantially synchronized motion of the decoys.

Figure 1:
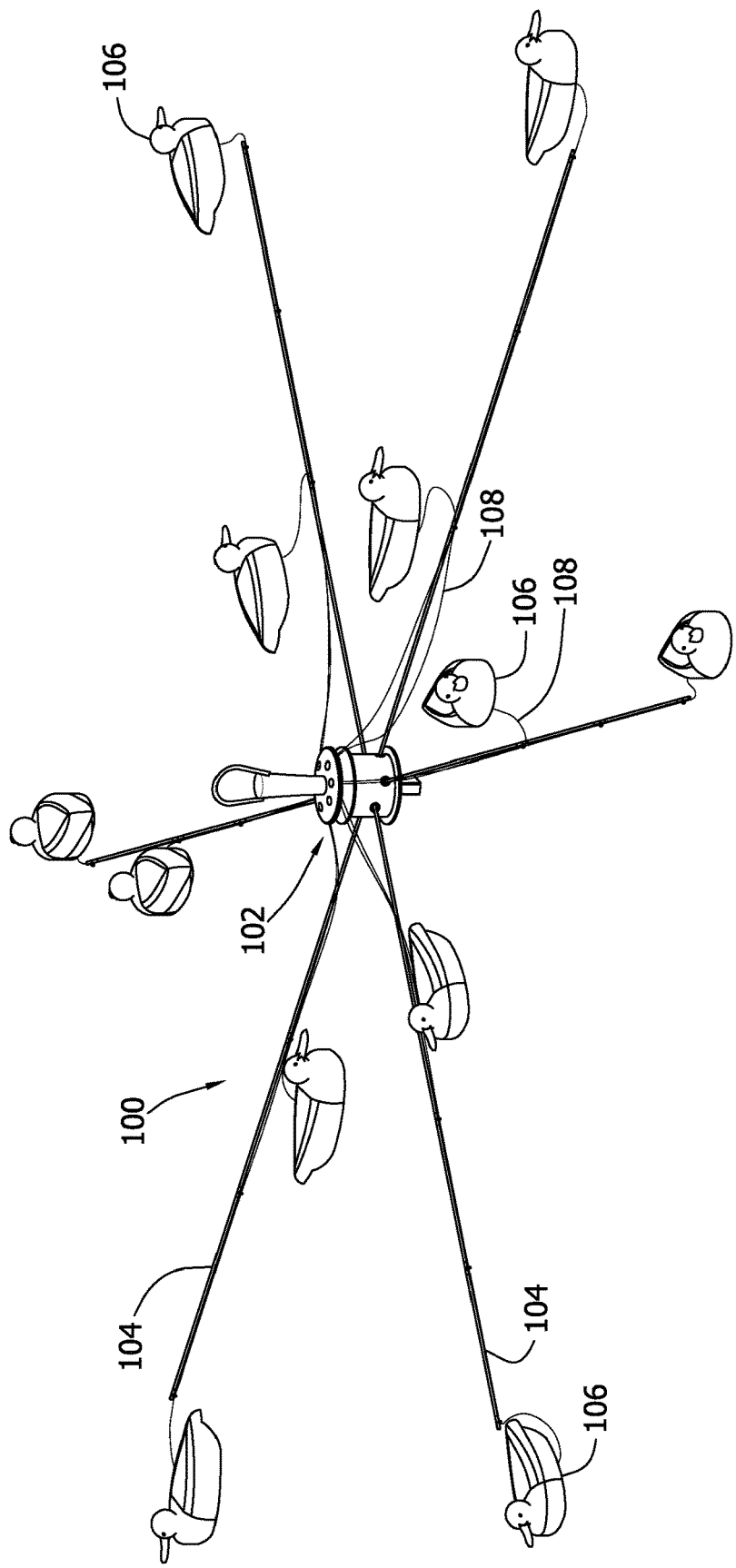
FIGS. 1-20 show exemplary embodiments of the apparatus described herein.

FIG. 1 is a schematic perspective view of an exemplary waterfowl, i.e., duck decoy deployment system 100. Alternatively, decoy deployment system 100 is adaptable for any other waterfowl including, without limitation, geese and swan. Duck decoy deployment system 100 includes a hub subsystem 102 located substantially at a center portion of system 100. Duck decoy deployment system 100 also includes a plurality of deployably extendable and flexibly collapsible arms 104 coupled to, and extending radially outward from, hub subsystem 102. In the exemplary embodiment, system 100 includes six substantially identical, fixed length arms 104. Alternatively, system 100 includes any number of arms 104 having any configuration including, without limitation, varying lengths and materials. Duck decoy deployment system 100 further includes a plurality of waterfowl, i.e., duck decoys 106 coupled to each arm 104 through a respective decoy tether 108, where some of tethers 108 have varying lengths (discussed further below). In the exemplary embodiment, system 100 includes at least one duck decoy 106 coupled to each arm 104, where, in the exemplary embodiment, two duck decoys 106 per arm 104 are shown for a total of twelve decoys 106. Alternatively, system 100 includes any number of duck decoys 106 having any configuration including, without limitation, varying lengths and materials.

Figure 2:
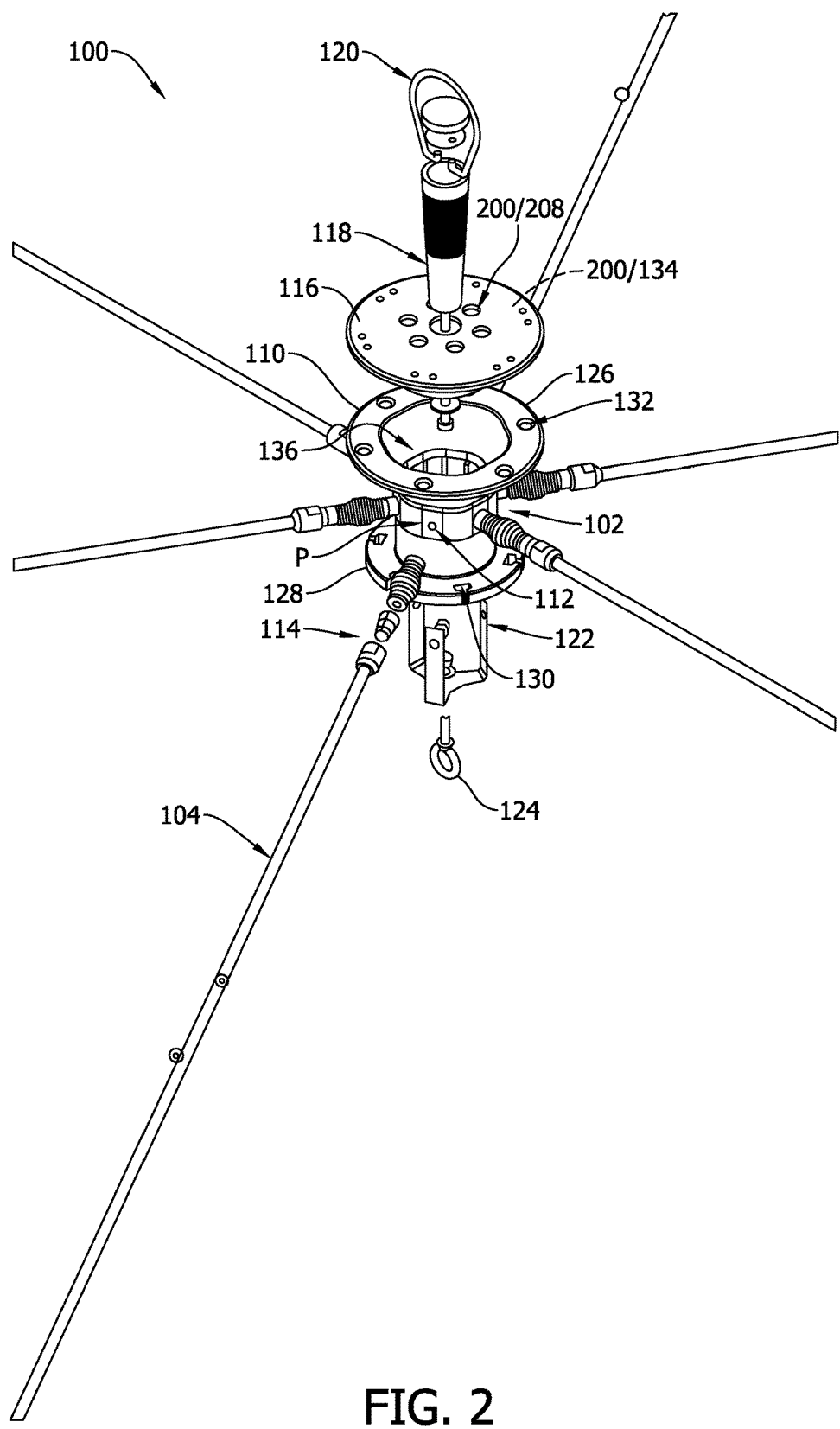

FIG. 2 is a schematic perspective partially exploded view of a portion of duck decoy deployment system 100. Duck decoys 106 and tethers 108 (not shown in FIG. 1) are not shown in FIG. 2 for clarity. Hub subsystem 102 includes a casing 110 that defines an external circumferential perimeter P. While casing 110 is substantially cylindrical in shape, any shape that enables operation of system 100 as described herein is used, including, without limitation, rectangular. Casing 110 defines a plurality of arm apertures 112 positioned about perimeter P. Duck decoy deployment system 100 includes a plurality of arm suspension mechanisms, i.e., a spring adaptor assembly 114. Each spring adaptor assembly 114 is inserted into a respective arm aperture 112.

In the exemplary embodiment, there are six spring adaptor assemblies 114 positioned approximately 60° apart from each other along circumferential perimeter P of casing 110. In general, spring adaptor assemblies 114 are positioned about circumferential perimeter P of casing 110 at circumferential positions of approximately 360 degrees divided by the number of arms 104. As such, hub subsystem 102 is substantially symmetrical. Alternatively, hub subsystem 102 has any configuration with any number of spring adaptor assemblies 114 and arms 104 that enable operation of system 100 as described herein.

Duck decoy deployment system 100 also includes a hub cap 116 coupled to the top of casing 110. A handle device 118 is coupled to hub cap 116, where handle device 118 extends longitudinally outward from hub subsystem 102. A wire loop 120 is coupled to handle device 118, where wire loop 120 extends from handle device 118. Handle device 118 and wire loop 120 facilitate placement and recovery of system 100 in aqueous environments through either hand placement or a hooked rod. Alternatively, any handling device that enables operation of system 100 as described herein is used, including, without limitation, an eye device that facilitates placement with a hook device.

Duck decoy deployment system 100 further includes an anchor plate 122 inserted within and coupled to the bottom of casing 110. Anchor plate 122 receives a weight coupling device, i.e., an anchor eye bolt 124, where anchor eye bolt 124 extends longitudinally outward from hub subsystem 102. Alternatively, any weight coupling device is used that enables operation of system 100 as described herein, including, without limitation, a weight device that couples directly to the bottom of casing 110.

Figure 3:
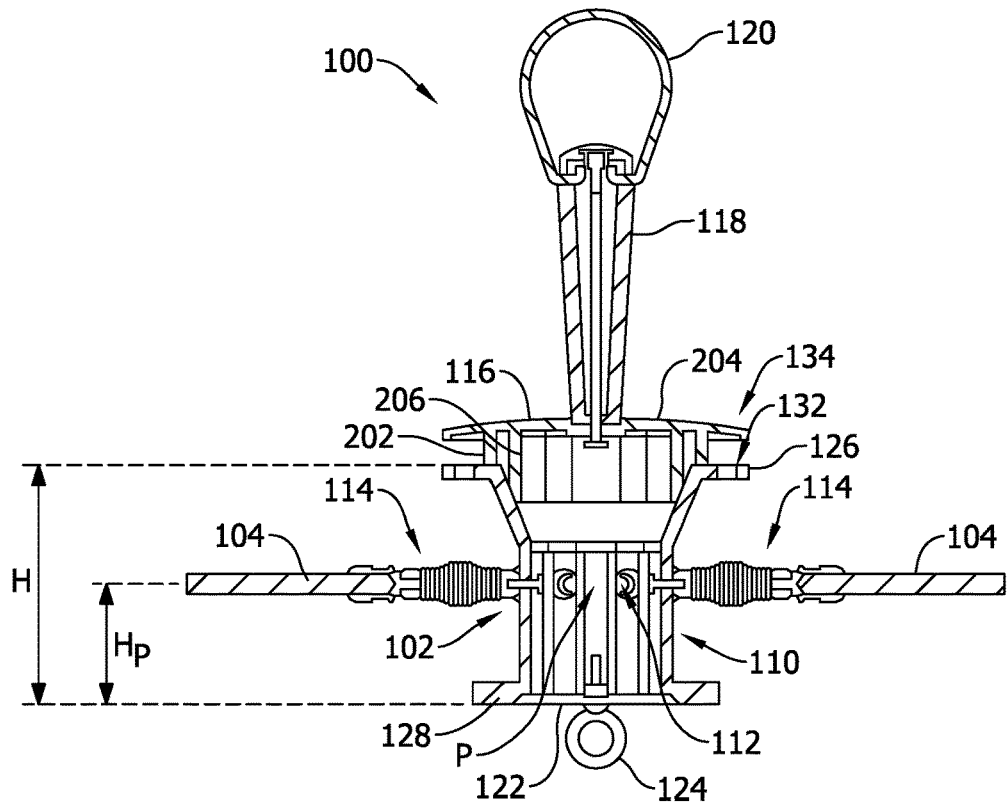
Figure 4:
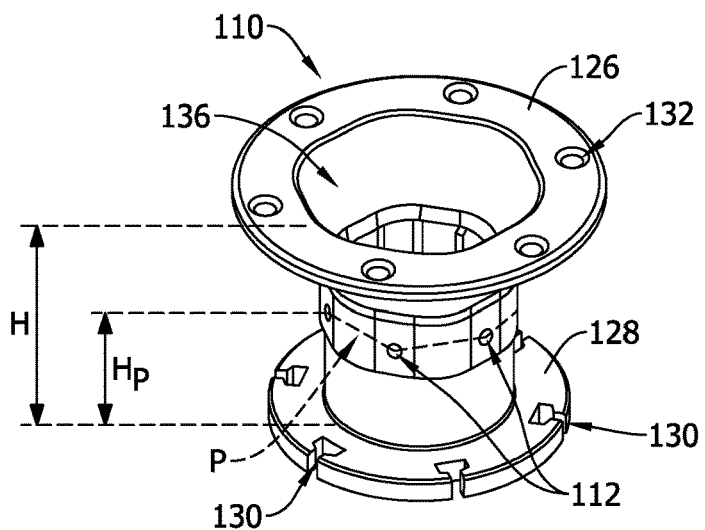

FIG. 3 is a schematic cutaway side view of a portion of duck decoy deployment system 100 including hub subsystem 102. FIG. 4 is a schematic perspective top view of casing 110. Referring to FIGS. 3 and 4, casing 110 of hub subsystem 102 includes an upper flange 126 and a bottom flange 128 longitudinally opposite upper flange 126. Upper flange 126 receives hub cap 116. Bottom flange 128 defines a plurality of line slots 130 therein. Line slots 130 are configured to receive a motive device (not shown) therein, where line slots 130 are configured to couple the motive device to casing 110 to facilitate motion of duck decoys 106 (shown in FIG. 1). Line slots 130 are also configured to receive an anchor line (not shown), where the anchor line extends through two or more line slots 130 and is wrapped, at least partially, about a portion of bottom flange 128 to facilitate reducing a potential for slippage of the anchor line off of casing 110.

Figure 5:
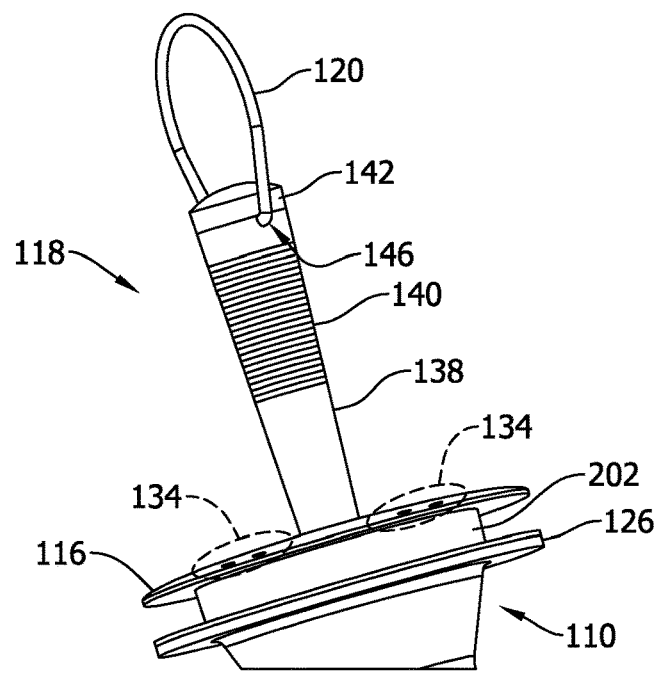
Figure 6:
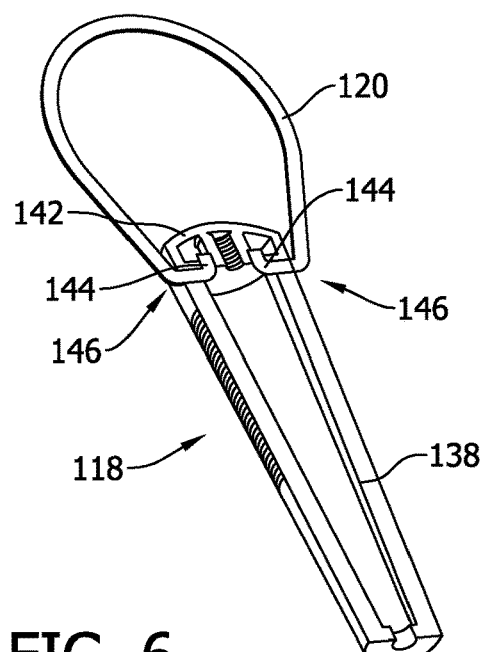

Casing 110 defines a casing height H, external circumferential perimeter P, where apertures 112 are positioned at a substantially similar height $H_P$. Upper flange 126 defines a plurality of tether guide openings 132 circumferentially positioned on flange 126 to substantially line up with, i.e., circumferentially coincide with apertures 112. In the exemplary embodiment, in a manner similar to spring adaptor assemblies 114 and apertures 112, tether guide openings 132 are positioned approximately 60° apart from each other along upper flange 126. In general, tether guide openings 132 are positioned about upper flange 126 at circumferential positions of approximately 360 degrees divided by the number of tether guide openings 132. Similarly, hub cap 116 defines a plurality of pairs of tether guide openings 134 circumferentially positioned on hub cap 116 to substantially line up with, i.e., circumferentially coincide with tether guide openings 132. In a manner similar to tether guide openings 132, pairs of tether guide openings 134 are positioned approximately 60° apart from each other along hub cap 116. In general, pair of tether guide openings 134 are positioned about hub cap 116 at circumferential positions of approximately 360 degrees divided by the number of pairs of tether guide openings 134. Tether guide openings 132 and 134 partially define a decoy tether guide subsystem (described further below) configured to receive respected tethers 108 (shown in FIG. 1) therethrough and reduce a potential for entanglement of tethers 108. Casing 110 defines an interior chamber FIG. 5 is a schematic side view of handle device 118 and hub cap 116 that may be used with duck decoy deployment system 100 (shown in FIGS. 1-3). FIG. 6 is a schematic cutaway perspective view of handle device 118. In the exemplary embodiment, handle device 118 is coupled to hub subsystem 102 through hub cap 116 with a combination of fastening hardware (not shown) and a friction fit. Alternatively, handle device 118 is coupled to hub cap 116 through any means that enables operation of system 100 as described herein, including, without limitation, adhesives and threaded fixtures. Handle device 118 includes a substantially frusto-conical handle 138 extending longitudinally outward from hub cap 116, where at least a portion of handle 138 includes a hand grip 140 (only shown in FIG. 5). Alternatively, handle 138 has any shape, configuration, and orientation that enables operation of system 100 as described herein. Handle device 118 also includes a handle cap 142 coupled to handle 138 through any means that enables operation of system 100 as described herein, including, without limitation, threaded fixtures, fastening hardware, and adhesives. Handle cap 142 receives a portion 144 of wire loop 120 through apertures 146 defined in handle 138 proximate handle cap 142.

Figure 7:
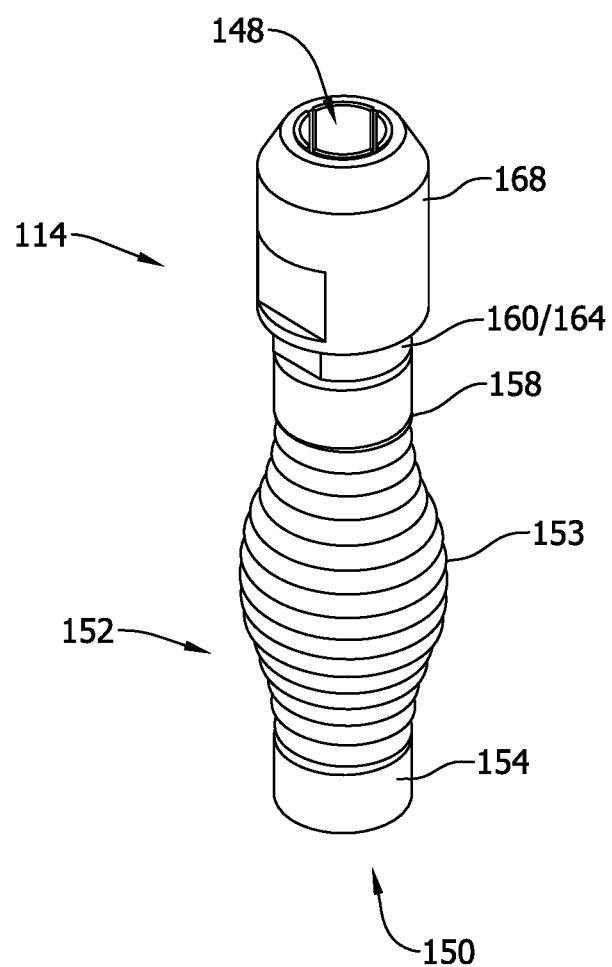
Figure 8:
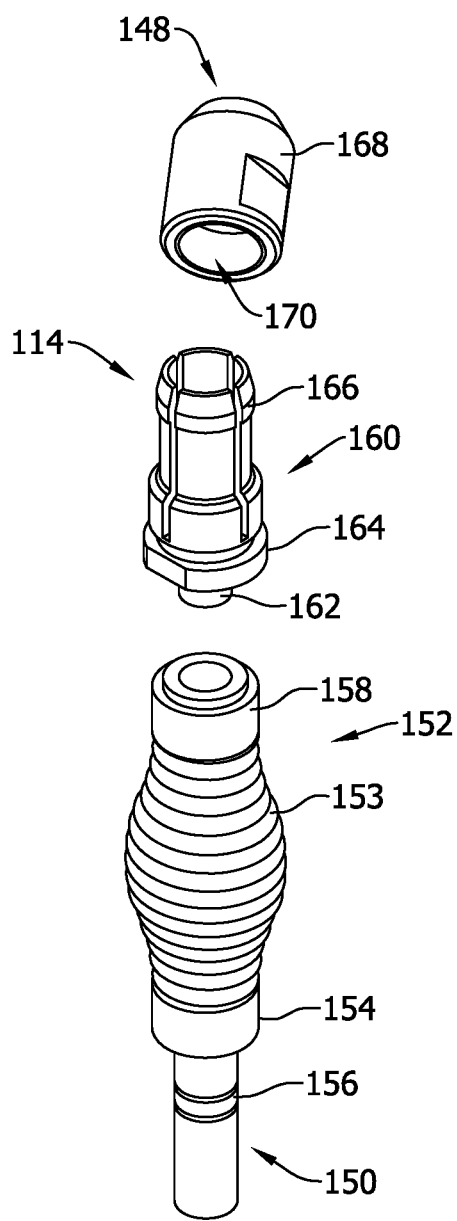

FIG. 7 is a schematic perspective view of arm suspension mechanism, i.e., spring adaptor assembly 114 that may be used with hub subsystem 102 (shown in FIG. 3). FIG. 8 is a schematic exploded view of spring adaptor assembly 114. Spring adaptor assembly 114 defines an arm cavity 148 configured to receive an arm 104 (shown in FIGS. 1-3). Spring adaptor assembly 114 also defines a casing end 150 configured to be received within arm apertures 112 (shown in FIGS. 2-4).

Spring adaptor assembly 114 includes a biasing device 152 that is inserted into inserted into arm apertures 112. In the exemplary embodiment, biasing devices 152 includes a constant-pitch, variable-diameter, constant-rate (i.e., a substantially non-varying spring constant with a predefined linearity) helical compression spring mechanism, or spring 153. Alternatively, biasing devices 152 are any devices that enable operation of duck decoy deployment system 100 as described herein, including, without limitation, biased hinge devices, variable- and multiple-pitch springs, constant-diameter springs (i.e., conical springs), and multiple rate springs. Biasing device 152 includes a casing collar 154 and insert hardware 156 (only shown in FIG. 8) for coupling biasing device 152 to casing 110 through a combination of coupling hardware and friction fit. Biasing device 152 further includes a collar 158. Spring adaptor assembly 114 is configured such that substantially unencumbered motion of biasing devices 152 in three dimensions is facilitated.

Spring adaptor assembly 114 includes a collet 160 coupled to biasing device 152 through a combination of hardware and friction fit. Collet 160 includes a biasing device coupling extension 162 that is received by collar 158. Collet 160 also includes a collet collar 164 configured to facilitate inserting biasing device coupling extension 162 into collar 158. Collet 160 further includes a plurality of collet arm segments 166 (only shown in FIG. 8) coupled to collet collar 164.

Spring adaptor assembly 114 further includes a collet nut 168 coupled to collet 160 through a combination of hardware and friction fit. Collet nut 168 defines a collet cavity 170 (only shown in FIG. 8) configured to receive and compress collet arm segments 166.

Figure 9:
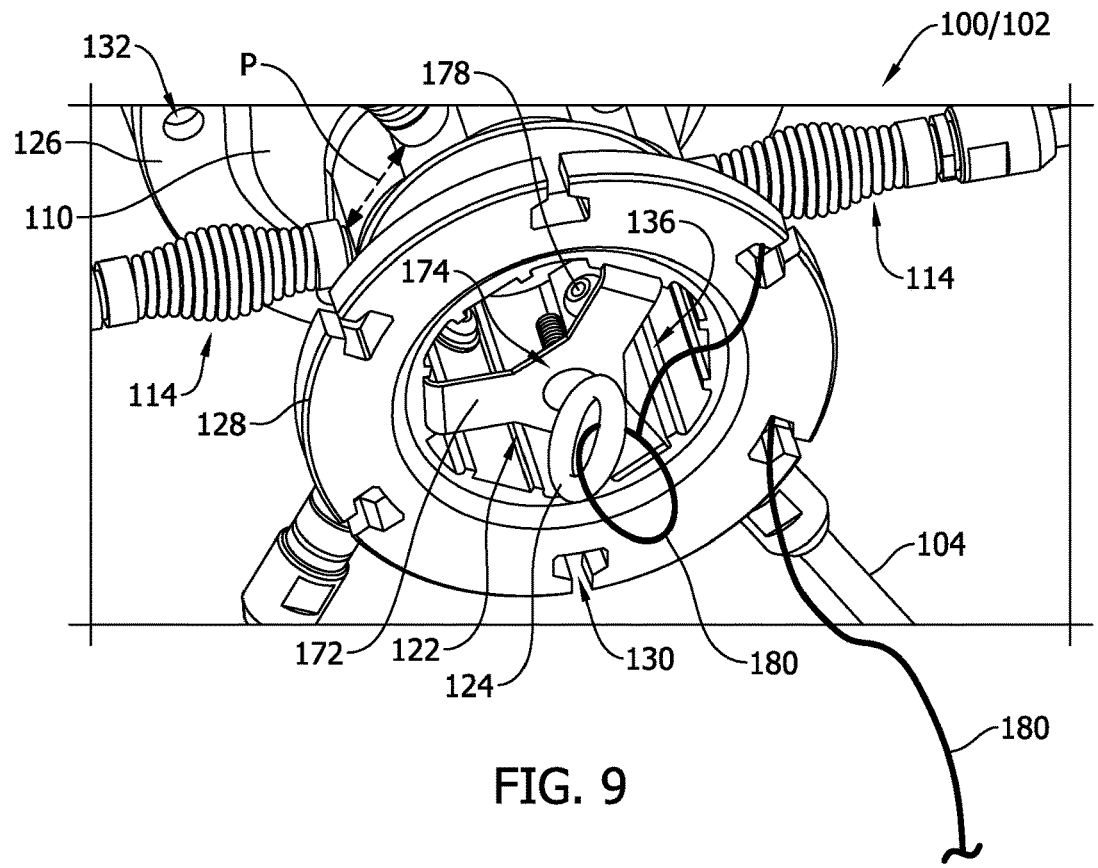
Figure 10:
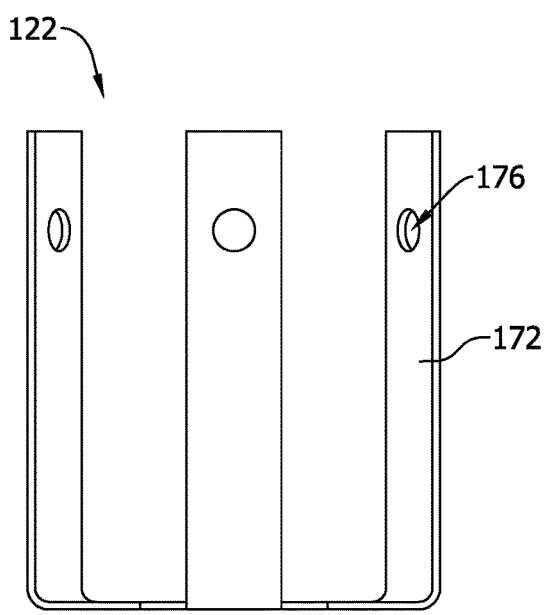

FIG. 9 is a schematic perspective bottom view of a portion of duck decoy deployment system 100. FIG. 10 is a schematic side view of anchor plate 122 that may be used with duck decoy deployment system 100. Anchor plate 122 includes a plurality of L-shaped members 172 (three shown) unitarily formed to define a threaded anchor eye bolt aperture 174 configured to receive anchor eye bolt 124. Alternatively, any means of assembling anchor plate 122 that enables operation of system 100 as described herein is used. In the exemplary embodiment, fastening hardware, such as a locknut (not shown) is used to secure receive anchor eye bolt 124 to anchor plate 122. Alternatively, any means are used to couple anchor eye bolt 124 to anchor plate 122 that enables operation of system 100 as described herein.

Anchor plate 122 is coupled to casing 110 through inserting anchor plate 122 into interior chamber 136, aligning fastener apertures 176 defined in each L-shaped member 172 with a corresponding fastener aperture (not shown) in casing 110, and inserting a fastener 178, such as, and without limitation, a cap screw with an accompanying lock washer (not shown) in the casing's fastener aperture. An anchor line 180, such as, and without limitation, nylon rope, is coupled to anchor eye bolt 124, looped about at least two line slots 130, and coupled to an anchor device (not shown) for facilitating substantially reducing a potential for translation of system 100 due to water currents. Line slots 130 are also configured to receive a motive device (not shown) therein, where line slots 130 are configured to couple the motive device to casing 110 to facilitate motion of duck decoys 106 (shown in FIG. 1). A sufficient number of line slots 130 (six shown) facilitate coupling the motive device using just two slots 130 while retaining two slots 130 for anchor line 180 as described above.

Figure 11:
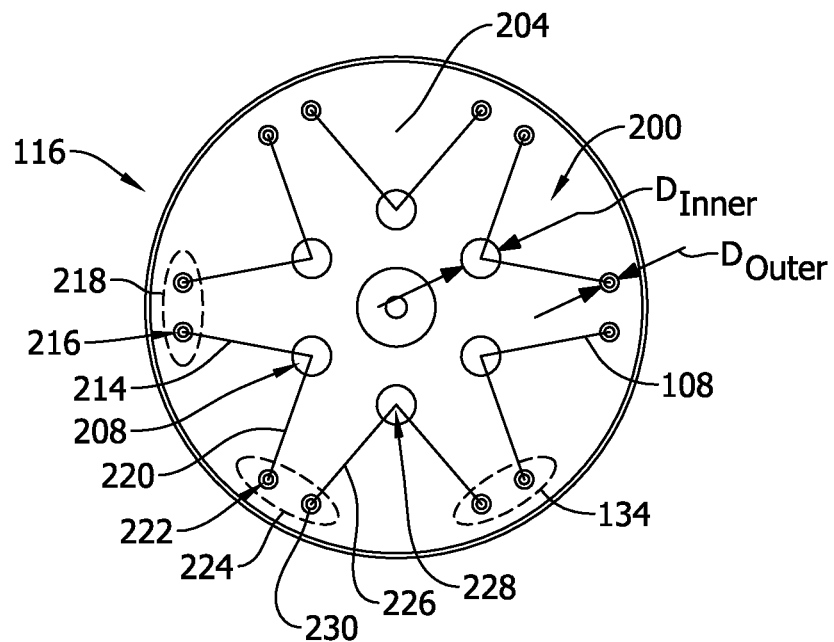
Figure 12:
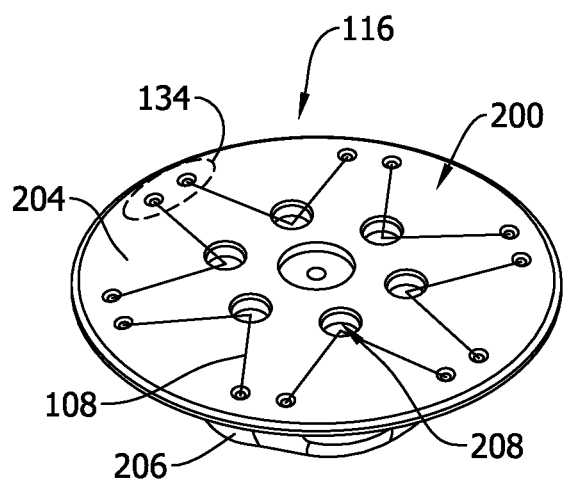
Figure 13:
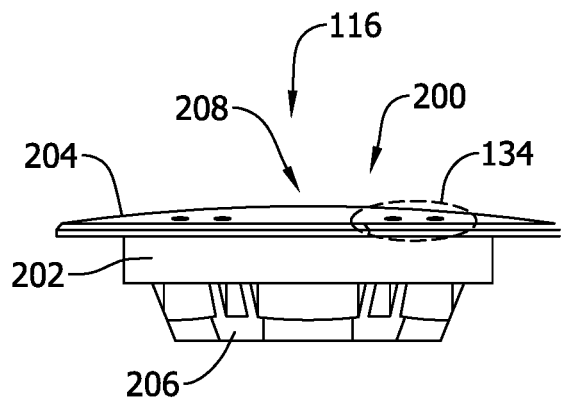
Figure 14:
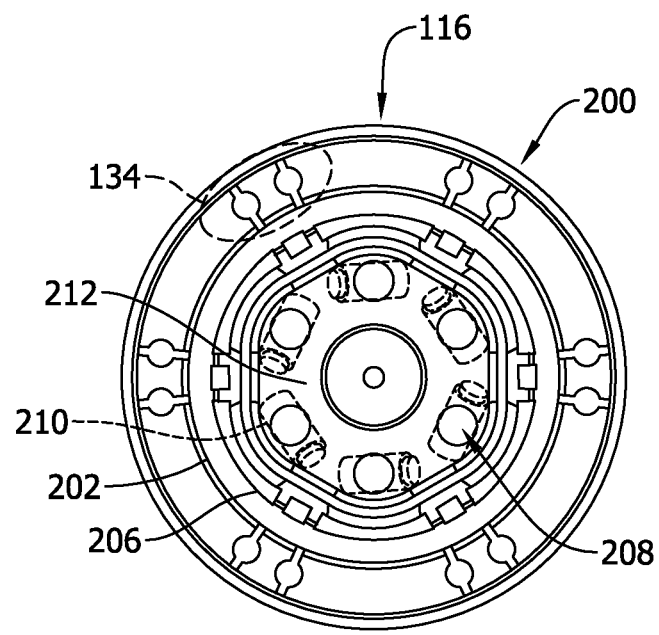

FIG. 11 is a schematic overhead view of hub cap 116 and a portion of an exemplary decoy tether guide subsystem 200. FIG. 12 is a schematic perspective overhead view of hub cap 116. FIG. 13 is a schematic side view of hub cap 116. FIG. 14 is a schematic bottom view of hub cap 116. Referring to FIGS. 11-14, hub cap 116 includes an outer lip 202 coupled to and extending from a top surface 204. Outer lip 202 contacts upper flange 126 of casing 110 (both shown in FIGS. 2-5) to define a stand-off distance between top surface 204 and flange 126 to facilitate routing tethers 108 (discussed further below). Hub cap 116 also includes an inner lip 206 that extends from top surface 204 a greater distance that outer lip 202. Inner lip 206 extends into interior chamber 136 to form a friction fit with casing 110 proximate upper flange 126 such that hub cap 116 remains removably coupled to casing 110.

Decoy tether guide subsystem 200 includes hub cap 116 and upper flange 126 of casing 110. Hub cap 116 includes a plurality of tether guides in the form of a plurality of radially inner decoy guide openings 208 and a plurality of radially outer decoy guide openings, i.e., pairs of tether guide openings 134. In the exemplary embodiment, radially inner decoy guide openings 208 and tether guide openings 134 are substantially circular. Radially inner decoy guide openings 208 have a diameter $D_{Inner}$ and tether guide openings 134 have a diameter $D_{Outer}$, where $D_{Inner}$ is greater than $D_{Outer}$. The values for diameter $C_{Outer}$ are selected to accommodate a plurality of tethers 108. The values for diameter $D_{Inner}$ are selected to accommodate a single tether 108 to facilitate reducing a potential for entanglement of tethers 108. In a manner similar to tether guide openings 132 in upper flange 126 (both shown in FIG. 2) and pairs of tether guide openings 134, radially inner decoy guide openings 208 are positioned approximately 60° apart from each other along top surface 204 of hub cap 116. In general, radially inner decoy guide openings 208 are positioned about top surface 204 at circumferential positions of approximately 360 degrees divided by the number of radially inner decoy guide openings 208. Alternatively, radially inner decoy guide openings 208 and tether guide openings 134 have any shape, configuration, and orientation that enables operation of system 100 as described herein.

Also, in the exemplary embodiment, tethers 108 are terminated proximate radially inner decoy guide openings 208. Decoy tether guide subsystem 200 further includes a plurality of tether securing devices 210, each tether securing device 210 coupled to a respective tether 108. Moreover, each tether securing device 210 has a size and a configuration that facilitates devices 210 contacting a bottom surface 212 to reduce a potential for devices 210 to traverse through the associated radially inner decoy guide opening 208, thereby securing the associated tether 108 to the underside of hub cap 116.

Further, in the exemplary embodiment, each tether 108 extends upward from respective tether securing device 210 through respective radially inner decoy guide opening 208 to a respective tether guide openings 134 along top surface 204 of hub cap 116. Tether 108 extends downward through tether guide opening 134 and through tether guide opening 132 of upper flange 126 toward a respective arm 104 (shown in FIG. 2).

Moreover, referring to FIG. 11, in the exemplary embodiment, a first decoy tether 214 extends from a first radially inner decoy tether guide opening 208 to one radially outer decoy tether guide 216 of a first pair of radially outer decoy tether guides 218. Also, a second decoy tether 220 extends from first radially inner decoy tether guide opening 208 to another radially outer decoy tether guide 222 of a second pair of radially outer decoy tether guides 224 adjacent first pair of radially outer decoy tether guides 218. Further, a third decoy tether 226 extends from a second radially inner decoy tether guide 228 to another radially outer decoy tether guide 230 of second pair of radially outer decoy tether guides 224.

Alternatively, tethers 108 are routed through decoy tether guide subsystem 200 with any routing configuration that enables operation of system 200 and system 100 as described herein.

Figure 15:
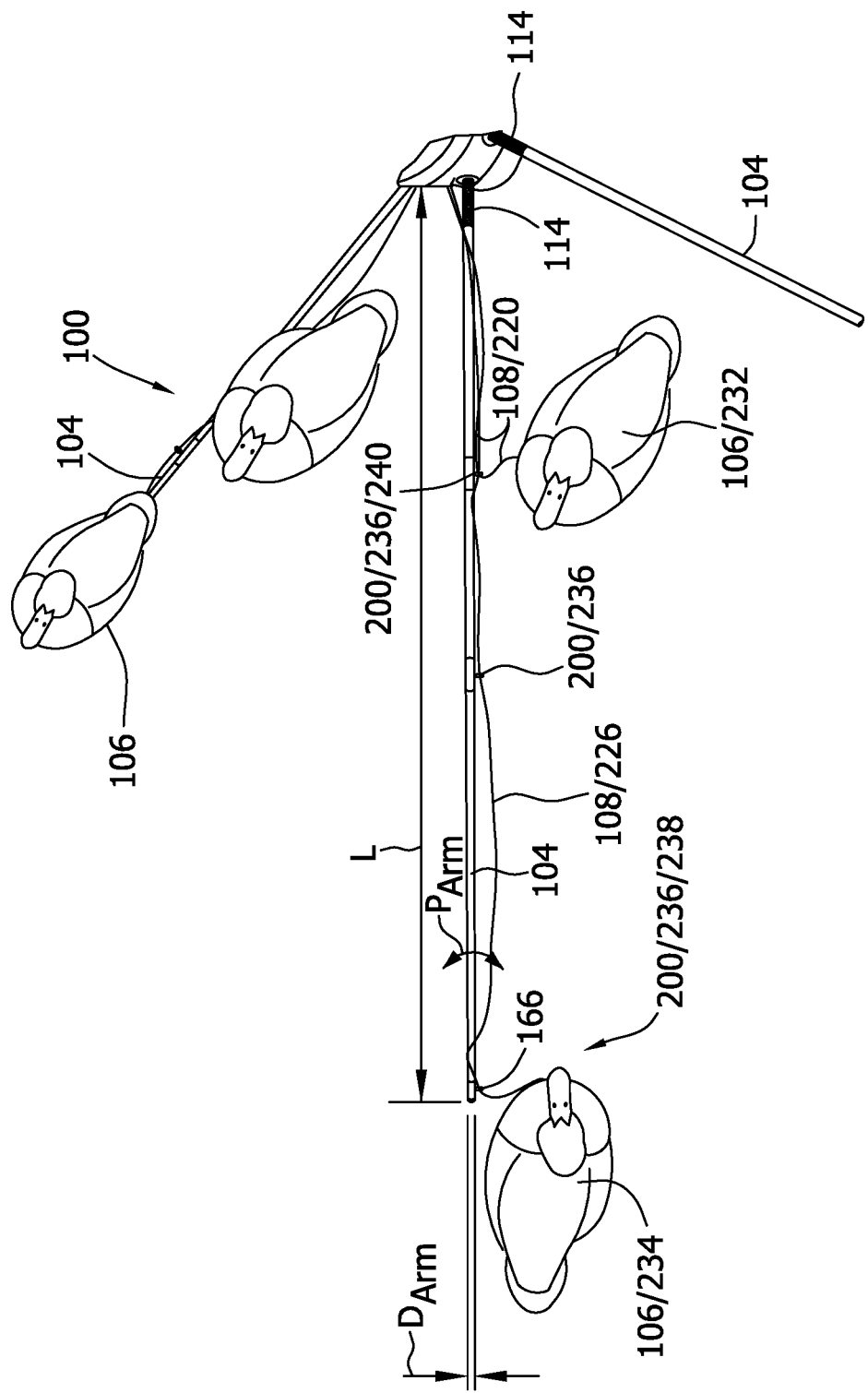

FIG. 15 is a schematic overhead view of deployably extendable and flexibly collapsible arm 104 and another portion of decoy tether guide subsystem 200 that may be used with duck decoy deployment system 100. In the exemplary embodiment, arm 104 has a fixed length L. Arm 104 has any length L that enables operation of system 100 as described herein. Second decoy tether 220 is coupled to arm 104 and a first duck decoy 232. Third decoy tether 226 is coupled to arm 104 and a second duck decoy 234. Arm 104 is substantially cylindrical in shape and defines a substantially constant diameter $D_{Arm}$ and a circumferential perimeter $P_{Arm}$. Alternatively, arm 104 has any shape that enables operation of system 100 as described herein, including, without limitation, oval, rectangular, and varying diameters, thicknesses, and perimeters. Arm 104 has any values of diameter $D_{Arm}$ and perimeter $P_{Arm}$ that enable operation of system 100 as described herein.

Also, in the exemplary embodiment, duck decoys 106 and tethers 108 are coupled to arm 104 through a plurality of guide devices 236 that define a portion decoy tether guide subsystem 200 discussed further below. The radially outermost guide device 238 is positioned proximate the outermost end of arm 104 and the radially inner guide device 240 is positioned approximately 33% of arm length L from hub subsystem 102.

Figure 16:
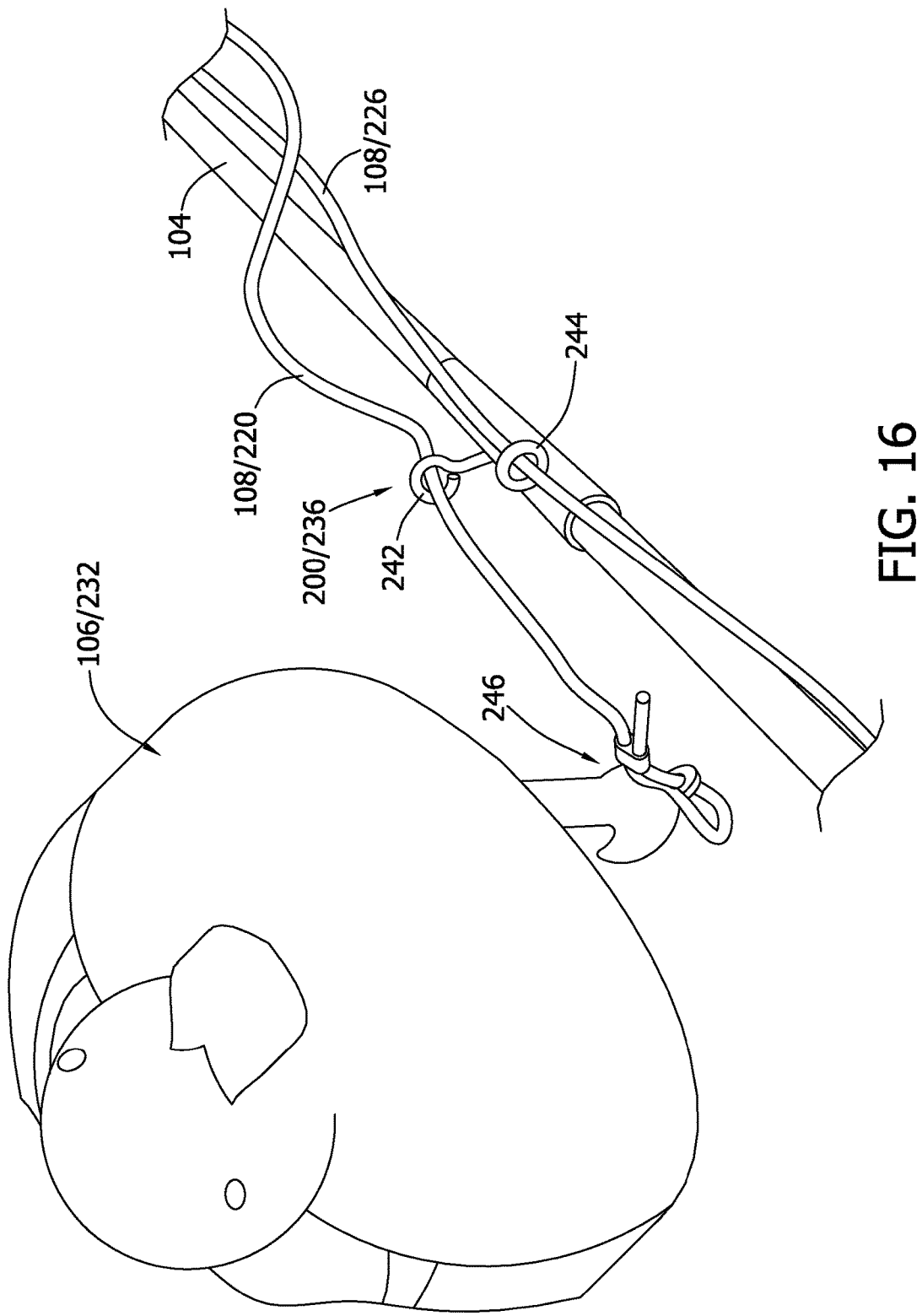
Figure 17:
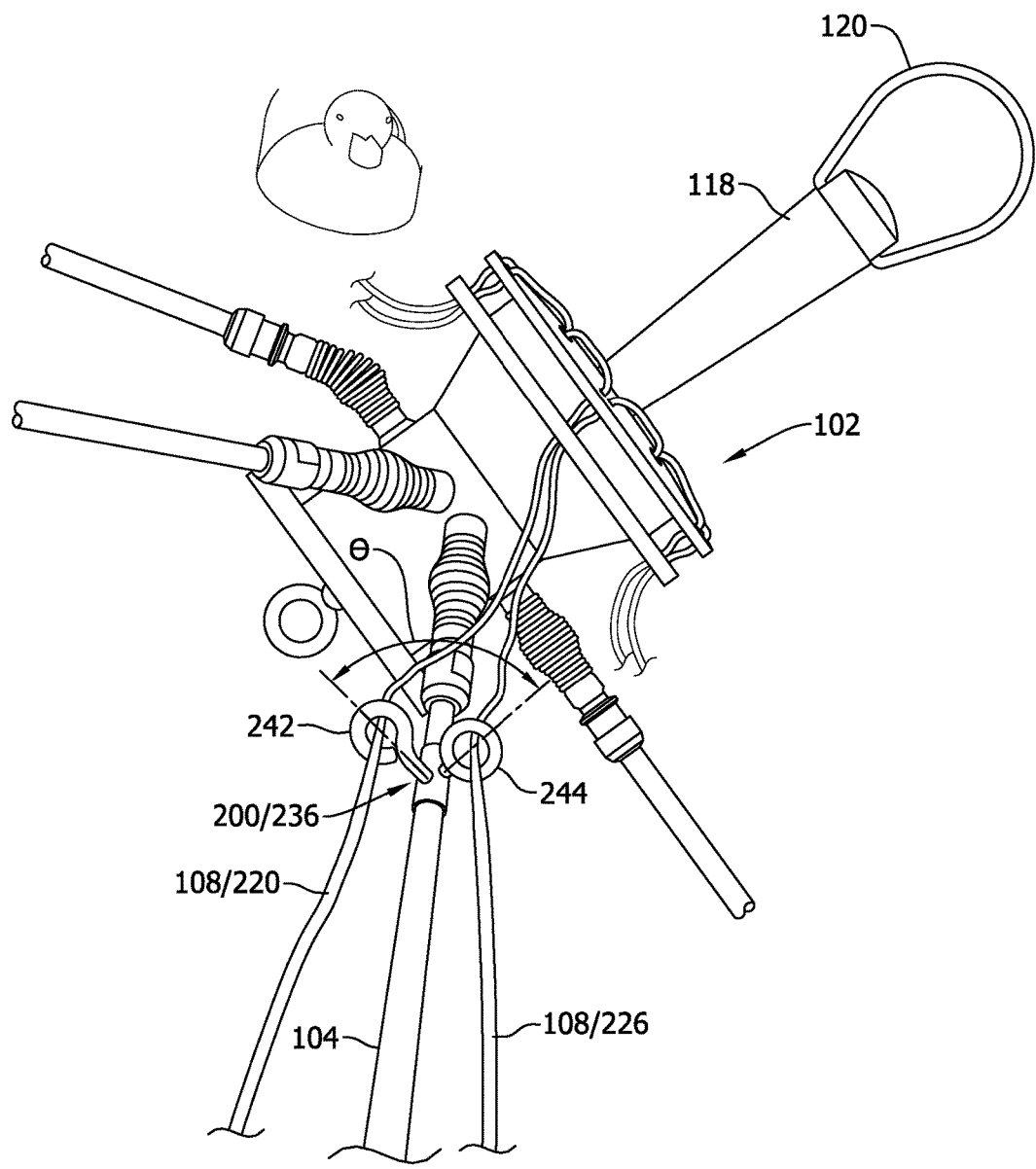
Figure 18:
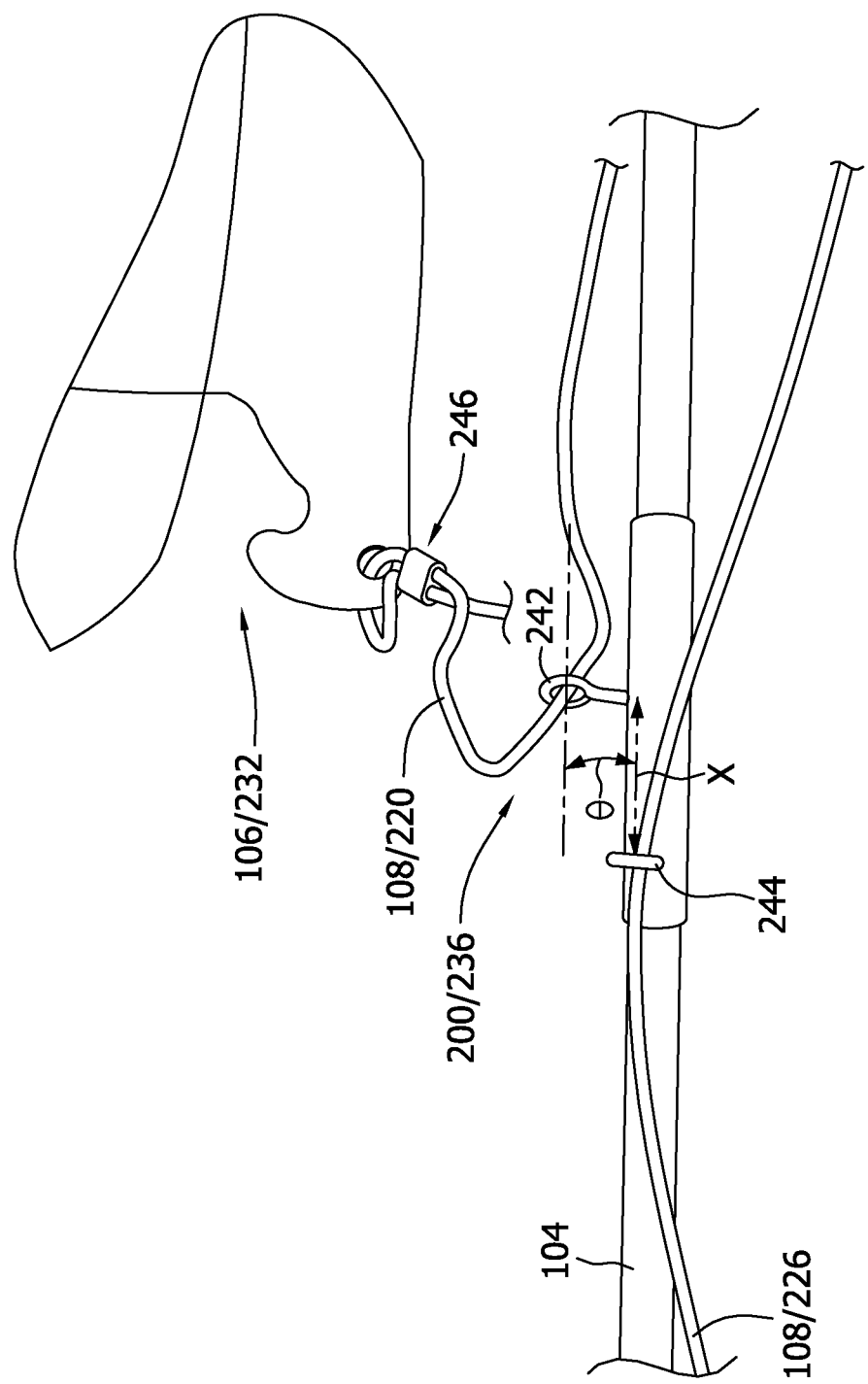

FIG. 16 is a schematic perspective view of a portion of deployably extendable and flexibly collapsible arm 104. FIG. 17 is a schematic longitudinal view of a portion of deployably extendable and flexibly collapsible arm 104. FIG. 18 is a schematic overhead view of a portion of deployably extendable and flexibly collapsible arm 104. A first guide device 242 and a second guide device 244 are coupled to arm 104 and positioned proximate each other. Guide devices 242 and 244 are eye bolts. Alternatively, guide devices 242 and 244 are any devices that enable operation of systems 100 and 200 as described herein, including, without limitation, tubular conduits.

First guide device 242 and second guide device 244 are indexed. i.e., they are separated with an angle θ and a distance X. Angle θ includes values within a range between approximately 30° and 45°, where in the exemplary embodiment angle θ is approximately a 45° angle. Distance X has a value of approximately 1.5 inches (38.1 mm). Alternatively, angle θ and distance X have any values that enable operation of system 100 as described herein. First guide device 242 and second guide device 244 are indexed to facilitate significantly reducing a potential for second decoy tether 220 and third decoy tether 226 to become entangled with each other. Second decoy tether 220 is threaded through first guide device 242 and third decoy tether 226 is threaded through second guide device 244. Second decoy tether 220 is coupled to first duck decoy 232 through a coupling device 246. In the exemplary embodiment, coupling device 246 is a crimped fastener. Alternatively, any coupling device that enables operation of systems 100 and 200 as described herein is used, including, and without limitation, waterproof tape.

Figure 19:
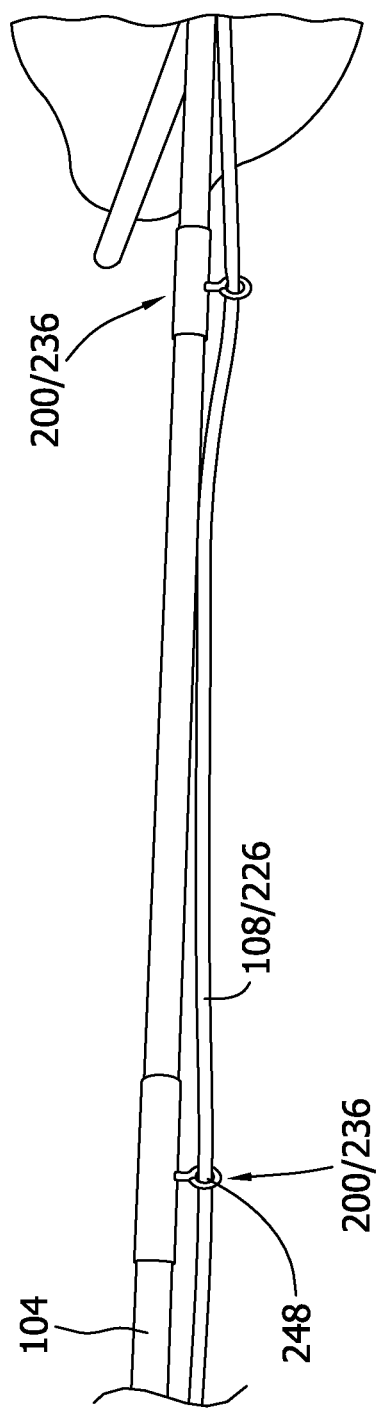
Figure 20:
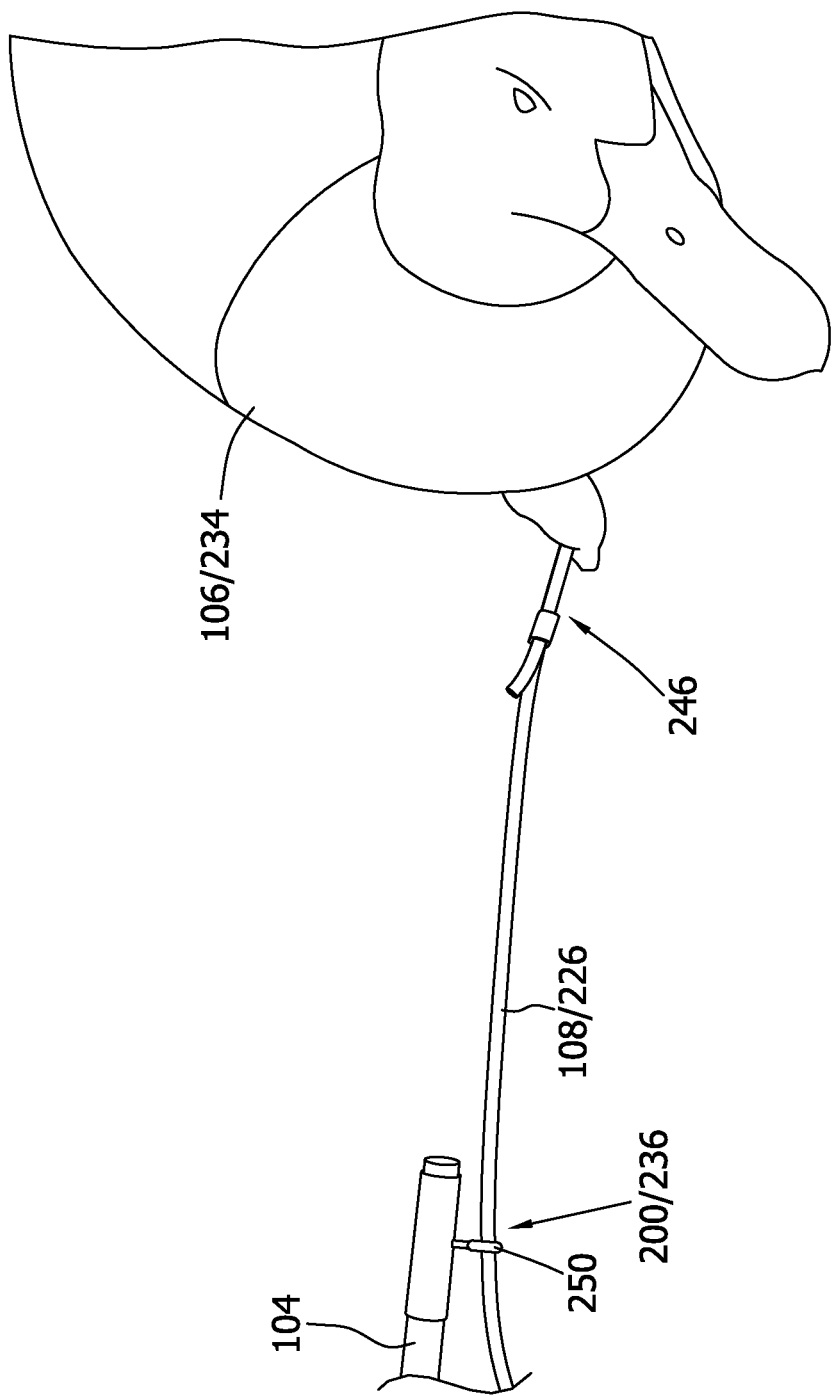

FIG. 19 is a schematic perspective view of another portion of deployably extendable and flexibly collapsible arm 104. FIG. 20 is another schematic perspective view of the portion of deployably extendable and flexibly collapsible arm 104. Decoy tether guide subsystem 200 includes a third guide device 248 (only shown in FIG. 19) and a fourth guide device 250 (only shown in FIG. 20). Guide devices 248 and 250 are eye bolts. Alternatively, guide devices 248 and 250 are any devices that enable operation of systems 100 and 200 as described herein, including, without limitation, tubular conduits.

Third decoy tether 226 is threaded through third guide device 248 and fourth guide device 250. Third decoy tether 226 is coupled to second duck decoy 234 through coupling device 246. In the exemplary embodiment, coupling device 246 is a crimped fastener. Alternatively, any coupling device that enables operation of systems 100 and 200 as described herein is used, including, and without limitation, waterproof tape.

Referring to FIGS. 1 through 20, in operation, duck decoy deployment system 100 is initially in a folded or collapsed condition, where arms 104 are substantially parallel to the longitudinal direction and handle device 118. As such, spring adaptor assemblies 114 have approximately a 90° bend upward. System 100 is lifted by handle device 118, and an anchor line 180 is coupled to anchor eye bolt 124, looped about at least two line slots 130, and coupled to an anchor device for facilitating substantially reducing a potential for translation of system 100 due to water currents. Line slots 130 are also configured to receive an optional motive device (not shown) therein, where line slots 130 are configured to couple the motive device to casing 110 to facilitate motion of duck decoys 106. System 100 is dropped into water of a predetermined depth, e.g., and without limitation, within a range between approximately 20 feet (6.1 meters) and 25 feet (7.6 meters).

While in the collapsed position, arms 104 are restrained with any restraining device that enables operation of system 100 as described herein, including, without limitation, a restraining band and rope. The restraining device is removed and arms 104 drop through gravity into the water into the extended, i.e., deployed condition. Hub subsystem 102 and the weight pull hub subsystem 102 below the surface of the water toward the bottom with a gradual submergence over time in contrast to a rapid sinking. As such, the weight coupled to anchor eye bolt 124 is selected based on the weight and buoyancy of system 100 as a whole, thereby establishing a relative neutral buoyancy for system 100. Arms 104 drop below the surface of the water and the buoyant duck decoys 106 float on the surface, thereby preventing further sinking of arms 104. Hub subsystem 102 eventually sits within a range between approximately 12 inches (30.5 centimeters (cm)) and 24 inches (61 cm) below the surface of the water, at least partially depending on the length of tethers 108. As such, with the exception of decoys 106, system 100 is substantially submerged and not visible to incoming waterfowl.

As arms 104 drop, each decoy tether 108 slides through the respective guide device 242, 244, 248, 250 and is at least partially restrained by the respective tether securing device 210, radially inner decoy guide opening 208, radially outer decoy tether guide 216 of the pair of tether guide openings 134, and tether guide opening 132 in upper flange 126. Such restraint of tethers 108 facilitates significantly decreasing entanglement of tethers 108 during deployment of system 100. Also, the indexing of guide devices 236 of decoy tether guide subsystem 200 as described above facilitates ease of deployment of system 100.

Hub subsystem 102 is free to rotate with the natural currents of the water and the wind. Therefore, arms 104, with duck decoys 106, are free to rotate with hub subsystem 102 with movements that simulate natural duck movements. Also, in operation, system 100 is retrieved through grabbing hub subsystem 102 through wire loop 120 coupled to handle 138, lifting system 100 out of the water, and placing into a bag-like transport device to place arms 104 into the collapsed position. Restraint and indexing of tethers 108 for deployment as describe above also facilitates significantly decreasing entanglement of tethers 108 during recovery of system 100.

The exemplary apparatus and systems described herein overcome at least some disadvantages of known waterfowl decoy deployment systems by providing a hub subsystem and a decoy tether guide subsystem to simplify deployment and retrieval of a large number of duck decoys while mitigating entanglement of the decoys and their tethers. Specifically, a hub cap on the top of the center casing of the hub subsystem uses a portion of the decoy tether guide subsystem to route the plurality of tethers from the hub cap to a plurality of deployably extendable and flexibly collapsible arms, where another portion of the decoy tether guide subsystem routes the individual tethers to the respective decoys. In addition, a unique spring-collet-collet nut assembly forms a biased arm suspension mechanism for each arm, where the biased arm suspension mechanisms facilitate arranging the configuration of the arms and tethers to not require any height indexing thereof to reduce a potential for tether entanglement. As such, the decoy tether guide subsystem described herein facilitates quick, independent, and automatic operation of a plurality of deployably extendable and flexibly collapsible arms extending therefrom. Additionally, the decoy tether guide subsystem facilitates mitigating a potential for entanglement of the decoys and their respective tethers. Furthermore, the waterfowl decoy deployment systems described herein a unique slot system for coupling devices, such as motive devices, to the waterfowl decoy deployment system, thereby facilitating substantially synchronized motion of the decoys.

An exemplary technical effect of the above-described waterfowl decoy deployment systems, hub subsystems, deployably extendable and flexibly collapsible arms, and decoy tether guide subsystem and methods includes at least one of the following: (a) simplifying deployment and retrieval of a large number of duck decoys while mitigating entanglement of the decoys and their tethers; (b) using a hub cap on the top of a casing of a hub subsystem as a portion of the decoy tether guide subsystem to route the plurality of tethers from the hub cap to a plurality of deployably extendable and flexibly collapsible arms, where another portion of the decoy tether guide subsystem routes the individual tethers to the respective decoys through indexed tether guides; (c) facilitating coupling and securing an anchor weight to the hub subsystem through looping about at least two line slots defined in a bottom flange of the hub subsystem casing; and (d) facilitating coupling of a motive device to the waterfowl decoy deployment system through at least two line slots defined in a bottom flange of the hub subsystem casing.

Exemplary embodiments of a waterfowl decoy deployment system are described above in detail. The waterfowl decoy deployment system is not limited to the specific embodiments described herein, but rather, components of the apparatus may be utilized independently and separately from other components described herein. For example, the features of the waterfowl decoy deployment system described herein may also be used in combination with other deployment systems that call for rapid and easy deployment and recovery.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A waterfowl decoy deployment system comprising:
   a hub subsystem comprising:
      a casing defining a plurality of apertures therein, said casing comprising an upper flange; and
      a plurality of arm suspension mechanisms, wherein each aperture of said plurality of apertures is configured to receive one arm suspension mechanism of said plurality of arm suspension mechanisms, each arm suspension mechanism of said plurality of arm suspension mechanisms comprising:
         a biasing device inserted into one aperture of said plurality of apertures;
         a collet coupled to said biasing device; and
         a collet nut coupled to said collet;
      a hub cap comprising a top surface and an outer lip extending from said top surface, wherein said outer lip engages said upper flange to space said top surface from said upper flange; and
      a plurality of arms extending radially outward from said casing, each arm of said plurality of arms coupled to said one arm suspension mechanism of said plurality of arm suspension mechanisms; and
   a plurality of waterfowl decoys, wherein at least one waterfowl decoy of said plurality of waterfowl decoys is coupled to said each arm; and
   a plurality of decoy tethers coupled to said plurality of waterfowl decoys, wherein said at least one waterfowl decoy of said plurality of waterfowl decoys is coupled to a respective decoy tether of said plurality of decoy tethers; and
   a decoy tether guide subsystem comprising said hub cap, said hub cap defining a plurality of tether guides therein, wherein said plurality of hub cap tether guides are substantially circular openings defined in said hub cap, said plurality of hub cap tether guides configured to receive at least a decoy tether of the plurality of decoy tethers and to reduce a potential for tether entanglement.

2. The waterfowl decoy deployment system in accordance with claim 1, wherein said biasing device comprises a spring mechanism.

3. The waterfowl decoy deployment system in accordance with claim 1, wherein said hub subsystem has a height dimension, said plurality of apertures positioned at a substantially similar height on said casing.

4. The waterfowl decoy deployment system in accordance with claim 1, wherein said casing comprises a circumferential perimeter, said each aperture of said plurality of apertures positioned with a predetermined circumferential spacing about said circumferential perimeter at circumferential positions of approximately 360 degrees divided by a number of said plurality of arms.

5. The waterfowl decoy deployment system in accordance with claim 4, wherein the predetermined circumferential spacing of said plurality of apertures about said circumferential perimeter is approximately 60 degrees.

6. The waterfowl decoy deployment system in accordance with claim 1 further comprising a handle device coupled to said hub subsystem, said handle device comprising a substantially frustoconical handle extending longitudinally outward from said casing, at least a portion of said substantially frustoconical handle comprising a hand grip.

7. The waterfowl decoy deployment system in accordance with claim 1 further comprising:
   an arm decoy tether guide subsystem comprising a plurality of guide devices coupled to said each arm of said plurality of arms, each respective guide device of said plurality of guide devices configured to receive said respective decoy tether, said each arm defining a perimeter, wherein said plurality of guide devices are positioned such that they are indexed with respect to the perimeter of said each arm, said plurality of guide devices configured to further reduce a potential for tether entanglement.

8. The waterfowl decoy deployment system in accordance with claim 1, wherein said hub subsystem further comprises a weight coupling device coupled to a bottom portion of said casing, said weight coupling device extends longitudinally outward from said casing.

9. The waterfowl decoy deployment system in accordance with claim 1, wherein said hub cap tether guides comprise inner tether guide openings and outer tether guide openings with respect to the center of the hub cap top surface, and wherein said upper flange also comprises a plurality of flange tether guide openings.

* * * * *